E. C. MOORE.
Designs for Spoon and Fork Handles.
No. 5,573. Reissued September 16, 1873.
Spoon & Fork Handles.
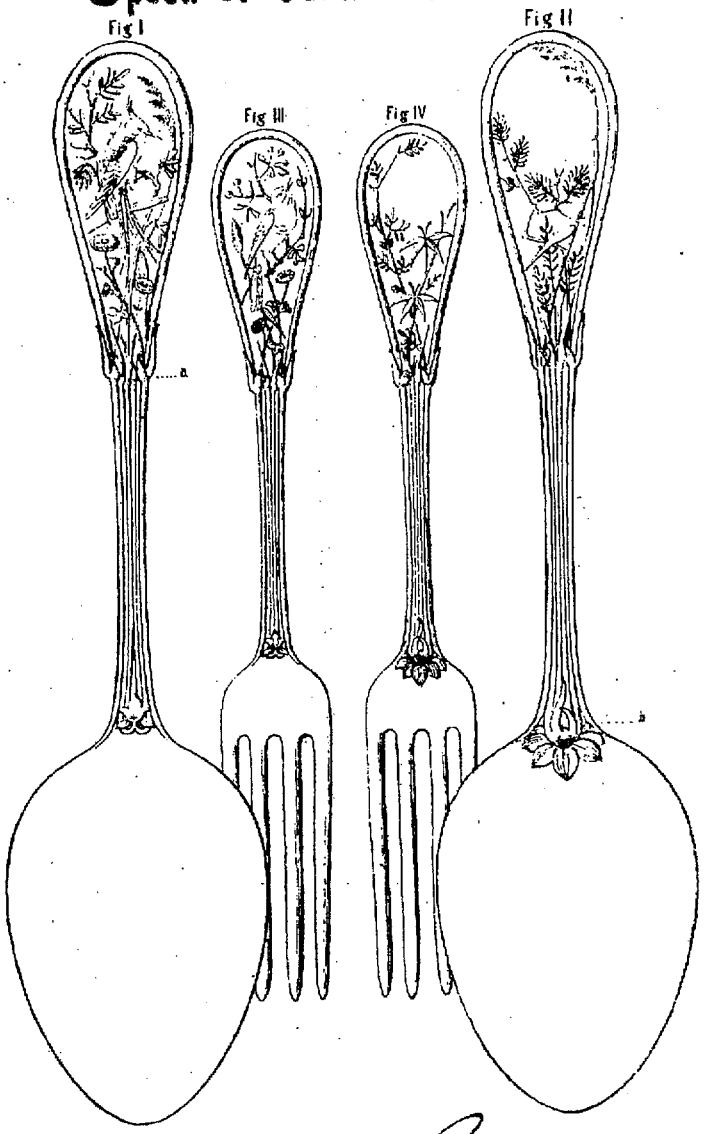
A. B. Godfrey
H. H. Phillips
Witnesses:
Edward C. Moore Inventor.

UNITED STATES PATENT OFFICE.

EDWARD C. MOORE, OF YONKERS, NEW YORK, ASSIGNOR TO TIFFANY & CO., OF NEW YORK CITY.

DESIGN FOR SPOON AND FORK HANDLES.

Specification forming part of Design No. 4,831, dated April 18, 1871; reissue No. 5,573, dated September 16, 1873; application filed July 24, 1873. [Term of Patent 7 years.]

*To all whom it may concern:*

Be it known that I, EDWARD C. MOORE, of Yonkers, Westchester county, State of New York, have invented and produced a new and original Design for the Handles of Spoons and Forks; and that the following is a full description thereof, reference being had to the accompanying drawings, making part of the specification, in which—

Figure 1 is a face view of the upper or front side; and Fig. 2, a face view of the under side or back part of the handle; and Figs. 3 and 4 are corresponding views of a modification of my said design, which I prefer for smaller spoons and forks.

The leading feature of my said design is the ornamenting of the front face of the upper or enlarged end of the handle by a bird perched on suitably arranged branches or twigs; and another feature of my said design is the ornamenting of the back face of the upper or enlarged end of the handle with branches, twigs, &c., omitting the perched bird, and leaving instead a plain surface on which to engrave the name or crest.

The stem or shank of the handle from *a* to *b* is slightly swelled toward each end, and the front and back faces thereof, and where it spreads into the bowl or fork a leaf is introduced. At the upper end *a* the handle spreads out to an oval form, as represented, and on the front face of the enlarged part above *a* there is a raised ornament of branches, twigs, buds, &c., substantially as represented, and a bird perched on the branches, as represented by Figs. 1 and 3; and on the back face of the enlarged upper end of the handle there is raised an ornament of branches, twigs, buds, &c.; but instead of the bird a plain surface is left, on which to engrave the name, crest, or other mark of ownership.

This design may be varied in the details, such as in the arrangement of the branches, twigs, flowers, buds, and the kinds and positions of the birds introduced, so long as the characteristic features of my design are preserved.

What I claim as my design for the handles of spoons and forks, or either, is—

1. The design for the front face of the upper or enlarged end of the handle, consisting of an arrangement of branches, twigs, &c., and a perched bird, substantially as described and represented.

2. The design for the back face of the upper or enlarged end of the handle, consisting of an arrangement of branches, twigs, &c., leaving an open plain space, substantially as described and represented, on which to engrave the name, crest, or other mark of ownership.

EDWARD C. MOORE.

Witnesses:
ROBERT MOORE,
W. H. SIMONSON.